Aug. 31, 1926.
W. L. MONRO
1,597,994
METHOD AND APPARATUS FOR ANNEALING AND COOLING SHEET GLASS
Filed Feb. 12, 1924 2 Sheets-Sheet 1
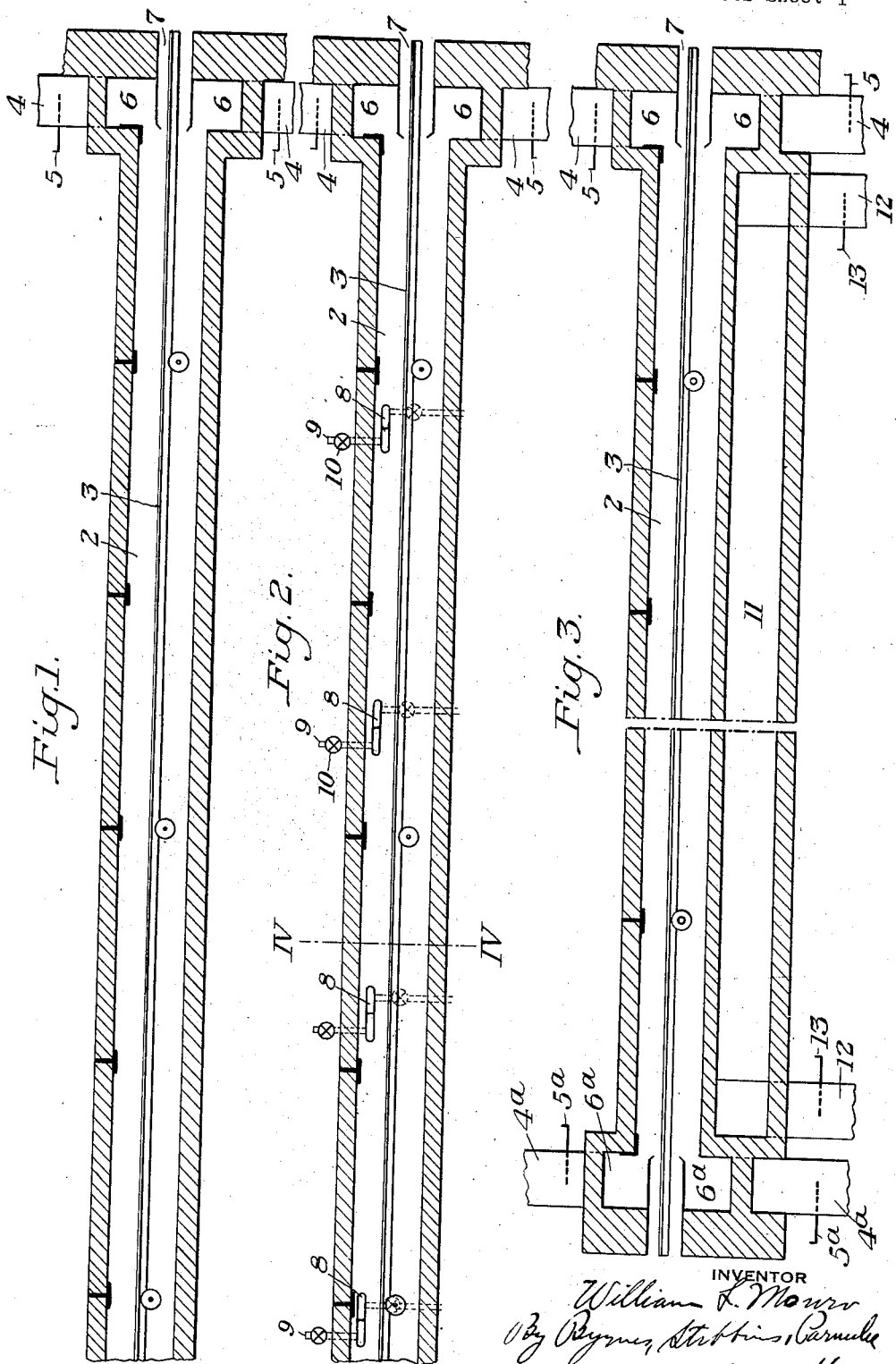

Patented Aug. 31, 1926.

1,597,994

UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

METHOD AND APPARATUS FOR ANNEALING AND COOLING SHEET GLASS.

Application filed February 12, 1924. Serial No. 692,249.

This invention relates to an improved method and apparatus for annealing and cooling sheet glass and may be applied to glass supplied either in separate sheets or in a continuous manner.

Heretofore glass leers have been provided with a source of heated gases, which gases travel through the leer tunnel concurrently and in the same direction with the glass and serve to decrease the rate at which the glass loses temperature, thus slowly annealing and cooling it and preventing breakage. The only reason for providing these heated gases is, as above stated, to prevent the too rapid cooling of the glass sheets, since a leer is essentially an apparatus for absorbing heat from the glass.

I provide a leer tunnel through which the glass is moved in one direction, while streams of gases above and below the glass are passed through the tunnel in the opposite direction. Thus streams of air or gases, previously heated or not, may be introduced at the delivery end of the leer and passed toward the end at which the glass enters. As the air or gas travels through the leer tunnel, it becomes hotter and hotter, so that when it comes into contact with the glass just entering the leer, it is at a high enough temperature that the glass does not break, but is cooled slowly. With a leer of this type it is unnecessary to supply the large quantity of heat which is required in leers of ordinary construction.

In the accompanying drawings illustrating the preferred embodiments of my invention;

Figure 1 is a vertical longitudinal section through a portion of a leer embodying my invention;

Figures 2 and 3 are similar views showing modified forms of the invention, intended to more nearly equalize temperature conditions above and below the glass level;

Figure 4:
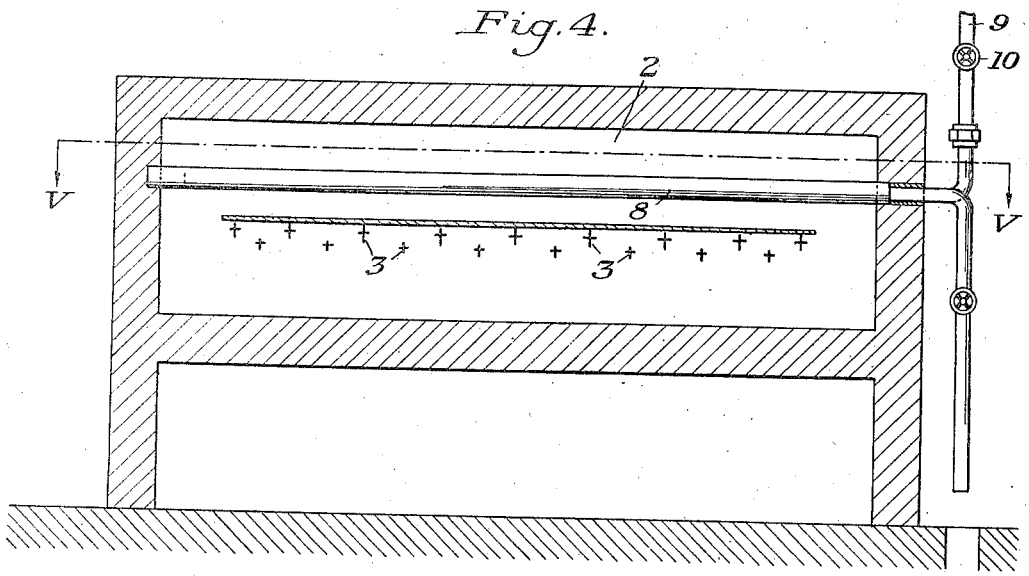
Figure 4 is a section on the line IV—IV of Fig. 2.

In the embodiment of the invention illustrated in Figure 1, there is shown a leer tunnel 2 having leer rods 3 of any suitable construction adapted to carry the glass from right to left as viewed in the drawing. When the leer is in operation, the glass on the rods 3 forms a substantially continuous division wall dividing the leer tunnel 2 into two passages; one above and one below the glass. Air, or other suitable cooling fluid, enters the leer tunnel adjacent the delivery end thereof and travels from left to right as viewed in the drawings. The passage of the gases through the leer is accomplished and controlled by suction pipes 4 having dampers 5 therein and connected to cross flues 6 leading to the spaces above and below the glass at or near its point of entry into the leer tunnel. The suction pipes 4 are connected to a suction fan or stack (not shown) for providing a suitable draft. By regulating the dampers 5, the relative velocity of the gaseous streams above and below the glass level may be varied in such manner as to substantially equalize the rate of heat loss from the two surfaces of the glass, thus producing a flat and unwarped product. In operation, flat hot glass is supplied to the leer through an opening 7 adjacent the end at which the gases are sucked from the leer tunnel.

In this, as in any other leer, the gases tend to rise toward the top as they become heated, so that there is a general tendency for the lower portion of the tunnel to remain at a temperature lower than the upper portion thereof and the dampers 5 may be adjusted to offset this natural tendency preferably by providing greater draft on the lower stream than on the upper stream.

Figure 5:
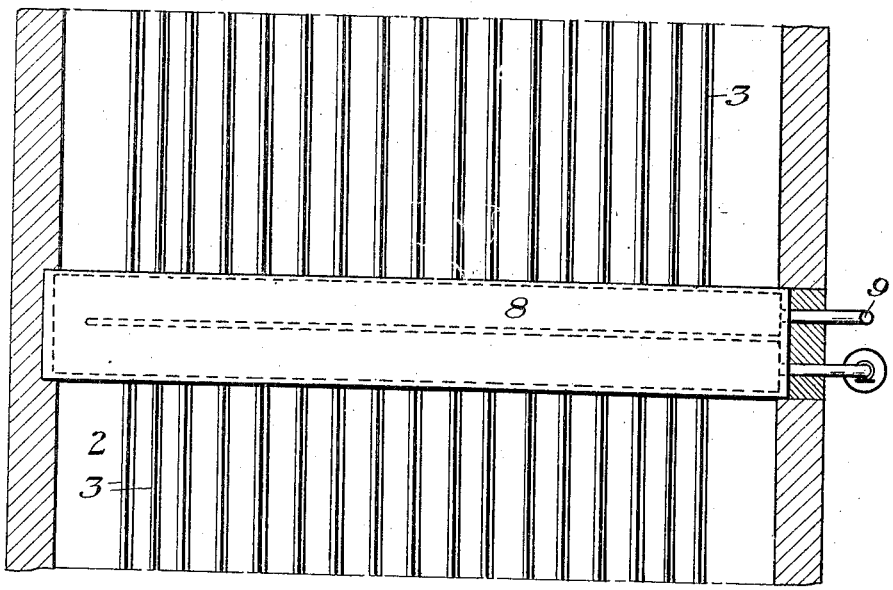
Figure 5 is a section on the line V—V of Fig. 4, showing a cooler as installed in the leer.

Figures 2 and 3 illustrate other ways of offsetting the same tendency. Figure 2 shows an apparatus similar to Figure 1, except that coolers 8 connected with fluid supply lines 9 having regulating valves 10 are provided in the upper portion of the leer tunnel and serve to cool the gases therein. As shown in Fig. 4, these coolers preferably extend the entire width of the leer tunnel and are preferably constructed as shown in Fig. 5, since this form of cooler insures a uniform cooling effect across the leer.

Another method of accomplishing the same result is shown in Figure 3, wherein the floor of the leer tunnel is provided with a heating flue or muffle 11 having a gas conduit 12 provided with a damper 13 at one or both ends thereof. Heated gases from any source are passed through the muffle 11 and serve to supply heat to the floor, so that the temperature from top to bottom is more nearly equalized. Preferably the heated gases in the muffle 11 travel in the same direction as the glass. Gas inlet flues 4ª having dampers 5ª and terminating in cross-flues 6ª may be provided for the entering air or gas, and are particularly desirable if the entering fluid is pre-heated. If pre-heated air is passed through the lower heating flue it may be fed into the glass outlet end of the leer, both above and below the glass. I may also combine the features of Figures 2 and 3 and use both the coolers above the glass and the heating flue beneath. Or air or gases heated in the lower flue may be fed in with the air entering the glass outlet end in unequal ratios, more being fed in below than above.

It will be further understood that the heating flues of Figure 3 may be applied to any embodiment of the invention. In any case it will be found desirable to make the openings through which the glass enters as tight as possible in order to prevent the ingress of air or gases in such quantities as to cause a "short-circuiting" of the flow. In the drawings it will be seen that a side wall of each cross flue lies very close to the leer rods and also has its edge portion bent over to reduce the opening as much as possible. If desired, the edge portions on the lower flues may be shaped to fit up between the rods.

I thus provide for annealing and cooling sheet glass and passing cooling gases in streams above and below the glass through a leer tunnel in a direction opposite to the direction of travel of the glass, and may vary the heat content of one of the streams by means other than the glass itself. By suitable regulation of such means the cooling effect of the two streams may be so regulated as to substantially balance the rate of heat loss from the two faces of the glass, whereby a flat and unwarped product is produced.

While my invention makes it unnecessary to heat the entering gases to the usual entering temperature of approximately 1000° F., it will be understood that I do not limit myself to the use of unheated gases, as it may be desirable, under certain conditions, to use warm gases. By so doing, the length of the leer tunnel may generally be shortened considerably.

While I have illustrated the preferred form of my invention, it will be understood that it is not limited to the illustrated embodiment, but may be otherwise embodied within the scope of the following claims.

I claim:

1. In the method of annealing and cooling sheet glass, the steps consisting of passing flat hot glass through a leer tunnel in one direction, and causing gaseous fluid initially cooler than the glass to travel through substantially the entire length of the tunnel in the opposite direction, and in contact with the glass, substantially as described.

2. In the method of annealing and cooling sheet glass, the steps consisting of passing flat hot glass through a horizontally extending leer tunnel in one direction, and causing gaseous fluid to travel through the tunnel in the opposite direction in streams, one above and one below the glass, substantially as described.

3. In the method of annealing and cooling sheet glass, the steps consisting of introducing flat hot glass to a leer tunnel, passing it therethrough in one direction, causing gaseous fluid to travel through the tunnel in the other direction in streams, one on each side of the glass, and varying the cooling effect of one stream relative to the other, substantially as described.

4. In the method of annealing and cooling sheet glass, the steps consisting of introducing flat hot glass to a leer tunnel, passing it therethrough in one direction, causing gaseous fluid to travel through the tunnel in the other direction in streams, one on each side of the glass, and varying the normal cooling effect of one stream relative to the other in amounts sufficient to substantially equalize the rate of heat loss from the two faces of the glass sheet, substantially as described.

5. In the method of annealing and cooling sheet glass, the steps consisting of introducing flat hot glass to a horizontally extending leer tunnel, passing it therethrough in one direction, causing gaseous fluid to travel through the tunnel in the other direction in streams above and below the glass, and amplifying the heat absorption capacity of the upper stream relative to the lower stream, substantially as described.

6. Apparatus for annealing and cooling sheet glass, including a leer tunnel, means for passing glass therethrough in one direction, and means for causing gaseous fluid to travel through the tunnel in the other direction in streams on each side of the glass, substantially as described.

7. Apparatus for annealing and cooling sheet glass, including a leer tunnel, means for passing glass therethrough in one direction, means for causing gaseous fluid to travel through the tunnel in the opposite direction in streams on each side of the glass, and means for varying the cooling effect of one of the streams, substantially as described.

8. Apparatus for annealing and cooling sheet glass, including a horizontally extending leer tunnel, means for passing glass therethrough in one direction, means for causing gaseous fluid to travel through the tunnel in the opposite direction in streams above and below the glass, and means for amplifying the normal cooling effect of the upper stream, substantially as described.

In testimony whereof I have hereunto set my hand.

WILLIAM L. MONRO.